United States Patent Office 3,426,057
Patented Feb. 4, 1969

3,426,057
ISOCYANATE COMPOUNDS AND PROCESS
FOR PREPARING SAME
Bernard Kanner, 33 Batavia Drive,
Williamsville, N.Y. 14221
No Drawing. Continuation-in-part of application Ser. No.
307,007, Sept. 6, 1963. This application June 23, 1966,
Ser. No. 559,746
U.S. Cl. 260—448.2          5 Claims
Int. Cl. C07f 7/12, 7/10

ABSTRACT OF THE DISCLOSURE

Process for preparing organosilicon compounds having functional isocyanate groups which comprises contacting at reaction temperatures in the presence of a platinum catalyst an organic isocyanate compound having the general formula:

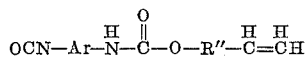

wherein Ar is a divalent arylene radical free of reactive substituent groups and attached to each of the adjacent nitrogen atoms in the molecule through different ring carbon atoms, R″ is alkylene radical containing from 1 to about 9 carbon atoms, with at least one hydrosilicone compound of the class consisting of silanes having the general formula:

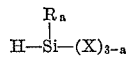

siloxanes having the general formula:

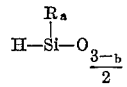

and siloxanes composed essentially of from 0.1 to 99.9 mole percent of the units having the formula:

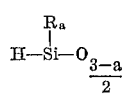

and complementarily from 99.9 to about 0.1 mole percent of units having the general formula:

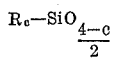

wherein R is a monovalent hydrocarbon group containing 1 to about 18 carbon atoms free of aliphatic unsaturation, and X is a member selected from the group consisting of halogen and —OR radicals, $a$ is an integer having a value of from 0 to 2 inclusive, and $c$ is an integer having a value of from 0 to 3 inclusive.

---

This application is a continuation-in-part of Ser. No. 307,007, filed Sept. 6, 1963, now abandoned.

The present invention relates in general to novel silanes and siloxanes containing isocyanato-organo functional groups and to a novel process for preparing same.

It is generally recognised in the art that silanes and siloxanes modified by the presence of an isocyanato-organo functional group or groups are highly desirable silicone compounds, primarily because of the reactive nature of the isocyanato group with other functional groups such as hydroxyl, amino, sulfhydryl, carboxyl, amide, and the like which contain an active hydrogen atom. Prior to the present, however, there have been proposed relatively few methods for preparing these compounds, and none of those proposed have been entirely suitable.

It is the general object of the present invention to provide a novel class of isocyanato-organo functional compounds and a novel process for their preparation. Other and more particular objects will be obvious from the specification appearing hereinafter.

The novel silicone compounds of the present invention are those of the class consisting of (A) silanes represented by the general formula:

(I) 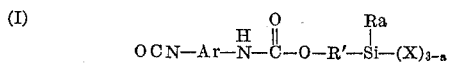

wherein Ar is a divalent arylene radical free of reactive substituent groups and being attached to each of the adjacent nitrogen atoms in the molecule through a different ring carbon atom, R′ is an alkylene radical containing from 3 to about 10 carbon atoms, X is halogen, e.g. chlorine or bromine or an —OR radical wherein R is a monovalent hydrocarbon group free of aliphatic unsaturation, and $a$ is an integer having a value of 0 to 2 inclusive; (B) organo-siloxane homopolymers represented by the unit formula:

(II) 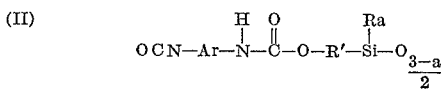

wherein Ar, R, R′, and $a$ represent the same groups as in Formula I above; and (C) siloxane copolymers composed essentially from 0.1 to 99.9 mole percent of units represented by Formula II and complementarily from 99.9 to 0.1 mole percent of units represented by the formula:

(III) 

wherein R represents the same groups as in Formula I above and $c$ has a value of from 0 to 3 inclusive.

Preferably Ar in Formulae I and II is a phenylene radical, either per se or having the structure (IV) 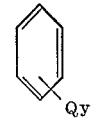

wherein Q is an alkyl group, preferably containing from 1 to 10 carbon atoms such as methyl, ethyl, propyl, amyl, octyl and decyl; a halogen e.g. chlorine, bromine, iodine, and fluorine; an aryl radical such as phenyl, naphthyl, p-phenyl-phenyl; an alkaryl group such as p-methyl-phenyl, or o-isobutyl-phenyl; or a halogenated aryl group such as chlorophenyl, bromophenyl and the like; and y has a value of from 0 to 2.

Illustrative of the groups represented by R in Formulae I and II above are the linear alkyl groups such as methyl, ethyl, propyl, butyl, octyl, and octadecyl; the cyclic alkyl groups such as cyclopentyl and cyclohexyl; the aryl groups such as phenyl, naphthyl; p-phenylphenyl; the alkaryl groups such as tolyl and zylenyl; and the aralkyl groups such as benzyl and phenylethyl. Preferably R is an alkvl group containing from 1 to 10 carbon atoms or a phenyl group, i.e. $C_6H_5$—.

Illustrative of the groups represented by R′ in Formulae I and II are propylene, n-butylene, isobutylene, n-hexylene, 2-ethylhexylene, n-octylene, and the like. Preferably R′ is a linear or branched chain alkylene radical containing from 3 to 11 carbon atoms inclusive.

The process of preparing the foregoing novel compounds in accordance with this invention comprises contacting at reaction temperatures, in the presence of a metal catalyst and optionally in the presence of an inert solvent medium, a hydro-silicon compound and an aryl isocyanate having the general formula:

(V)
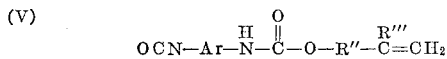

wherein Ar designates hte same group specified for Ar in Formulae I and II above, R'' is an alkylene radical containing from 1 to 9 carbon atoms, and R''' is hydrogen or methyl. The reaction that occurs is an addition reaction that can be illustrated by the skeletal equation:

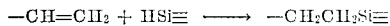

The hydrosilicon reactants suitably employed in the present process include the organo(hydrocarbonoxy) silanes represented by the formula:

(VI)

wherein R is a monovalent hydrocarbon group free of aliphatic unsaturation as defined in Formula I above, X is halogen, e.g. chlorine or bromine and an —OR radical, and $a$ has a value of from 0 to 2 inclusive; the organosiloxanes composed of groups represented by the formula:

(VII)

wherein R and $a$ represent the same groups as in Formula II above; and those siloxanes that are composed essentially of from 0.1 to 99.9 mole percent of groups represented by Formula VII and complementarily from 99.9 to 0.1 mole percent of groups represented by the formula:

(VIII)

wherein R is hydrogen or a monovalent hydrocarbon group free of aliphatic unsaturation as defined in Formula III above, and $c$ has a value of from 0 to 3 inclusive. Preferably these latter siloxanes are composed of from about 5 to 99.9 mole percent of groups represented by Formula VII and from 0.1 to 95 mole percent of groups represented by Formula VIII. In such copolymeric siloxanes the manner of arrangement of the different type siloxane groups with respect to each other is not critical. Thus the various groups can be arranged to cyclic, linear, or cross-linked configuration, or in combination thereof.

The term "monovalent hydrocarbon group" is employed here in the generic sense and is intended to denote substituted as well as unsubstituted hydrocarbon groups provided that any substituent group present is inert in the reaction system employed.

Illustrative of the organo(hydrocarbonoxy) silanes represented by Formula VI are triethoxysilane, methyldiethoxysilane, di-methylethoxysilane, pentyldibutoxysilane, betaphenylethyldipropoxysilane, diphenylphenoxysilane, cyclohexyldimethoxysilane, beta-naphthyl dipropoxysilane, and dipropyl(phenoxy)silane.

Illustrative of the groups represented by Formula VII are $HSiO_{3/2}$, methylhydrogensiloxy, dimethylhydrogensiloxy, butylethylhydrogensiloxy, pentylcyclohexylhydrogensiloxy, cyclopentylhydrogensiloxy, pentylhydrogensiloxy, diphenylhydrogensiloxy, phenylmethylhydrogensiloxy, p-ethylphenylhydrogensiloxy, and naphthyl (butyl)hydrogensiloxy groups.

Illustraitve of the groups represented by Formula VIII are $SiO_2$, methylsiloxy, dimethylsiloxy, trimethylsiloxy, amylsiloxy, diphenylsiloxy, methyldiphenylsiloxy, and betaphenylethyl(methyl)siloxy

[i.e. $C_6H_5CH_2CH_2Si(CH_3)O$]

groups.

The aryl isocyanate compounds suitably employed as starting materials in the practice of this invention are those which correspond to the general formula:

(IX)
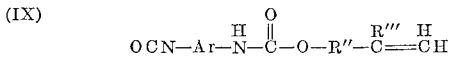

wherein Ar represents the same divalent aryl radicals as in Formula I above, R'' represents a divalent alkylene radical containing from 1 to about 9 carbon atoms, preferably from 1 to about 4 carbon atoms, and R''' is hydrogen or methyl. Illustrative of the alkylene radicals represented by R' are methylene, ethylene, n-propylene, amylene, n-octylene, 2-ethylhexylene, and the like.

The aryl isocyanate compounds represented by Formula IX are old in the art and can readily be prepared by the reaction of a monoolefinically unsaturated aliphatic alcohol with an aryl diisocyanate having the general formula:

(X)

wherein Ar is a divalent aryl radical free of reactive substituents other than the two essential isocyanate groups, and being attached to each of the adjacent nitrogen atoms in the molecule through a different aromatic ring carbon atom. O in each occurrence represents the same ring susbtituents as in Formula IV above, and $y$ has a value of from 0 to 2. Preferably the diisocyanate corresponds to the general formula:

(XI)
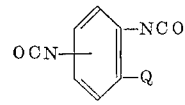

wherein Q is a monovalent hydrocarbon radical or a halogen preferably an alkyl group containing from 1 to 6 carbon atoms, and wherein one of the isocyanate groups is attached to a ring carbon atom non-adjacent to the ring carbon atom to which the Q group is attached. It has been found that diisocyanates of the preferred formula have one isocyanate group more reactive than the other, thereby permitting the preparation of the compounds of Formula IX with greater facility and in substantially greater yields.

The monoolefinically unsaturated aliphatic alcohols suitably reacted with the diisocyanates for Formulae X or XI to form the compounds of Formula IX correspond to the general formula:

(XII)

wherein R'' is a straight or branched chain alkylene radical having from 1 to 9 carbon atoms and preferably from 1 to 4 carbon atoms, and R''' is hydrogen or methyl. Illustrative of the divalent R'' groups are methylene, ethylene, propylene, butylene, isoamylene, n-amylene, n-hexylene, and the like.

Reaction of the diisocyanate and the unsaturated aliphatic alcohol is advantageously carried out using molar proportions of alcohol to diisocyanate with the ratio range of about 0.1 to 2.0 preferably about 0.8 to 1.2. The reaction temperature is not a critical factor, and can in general be within the range of from about —50° C. to about 200° C. with 0° C. to about 150° C. being the generally preferred temperature range. Where the two isocyanate groups on the aryl diisocyanate reactant are of unequal reactivity however, temperatures within the range of about 0° C. to about 40° C. favor greater selectivity to produce the desired mono-substitution product.

The process whereby the novel silicon isocyanates of this invention are produced comprises contacting any one, or a mixture of two or more, of the compounds of Formula V with any one or a mixture of two or more of the hydrosilicon compounds of Formulae VI and VII at elevated temperatures in the presence of a platinum, palladium, or platinum containing catalyst. These catalysts include finely divided elemental platinum (supported, if desired, on materials such as charcoal, asbestos, and/or silica gel), elemental palladium, and platinum compounds such as chloroplatinic acid. The preferred catalysts are finely divided platinum supported on the gamma allotrope of alumina and chloroplatinic acid. Amounts of catalyst that provide from 0.0001 to 5.0 parts by weight of platinum per 100 parts by weight of the reactants are generally useful. At the completion of the reaction, the catalyst can be removed from the reaction mixture by suitable means, e.g., by filtration.

The temperature of the reaction is not a critical factor and can vary over a wide range. It has been found in general that temperatures from about 50° C. to about 250° C. are suitable, with temperatures of from about 90° C. to 150° C. being preferred.

Advantageously inert liquid organic solvents can be employed as a reaction medium to achieve a more intimate contact of the reagents, but such solvents are not essential to the effective operation of the process. Typical of suitable inert solvents are benzene, toluene, xylene, petroleum ether, acetone, diethyl ether, dioxane, and dimethylformamide.

The following examples are illustrative of the present invention but are intended in no way to be limitative thereof.

EXAMPLE 1

Preparation of aryl isocyanate

To a 2 liter dry glass reactor equipped with a dropping funnel, thermometer and stirring means, and protected from the atmosphere by a nitrogen purge, was charged 174.2 grams (1.0 moles) of tolylene diisocyanate and 200 ml. anhydrous diethyl ether. The mixture was cooled to about 0° C. and 72.1 grams (1 mole) of methallyl alcohol was slowly added over a period of about 5 minutes. The reaction system was maintained between 20° C. and 30° C. with stirring for about 5 hours, at the end of which period the reaction mass was vacuum stripped under a pressure of about 1 mm. Hg. The resulting crude residue was further purified by means of a molecular still to yield 161.5 grams of the compound having the formula:

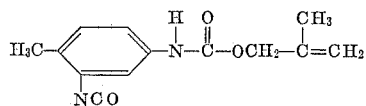

the structural assignment of which was verified by infrared spectral analysis.

EXAMPLE 2

Preparation of aryl isocyanate

To a dry glass reactor equipped with a dropping funnel, thermometer and stirring means, and protected from the atmosphere by a nitrogen purge, was charged 87 grams (0.5 mole) of tolylene diisocyanate (containing 80 mole percent of the 2,4 isomer and 20 mole percent of the 2,6 isomer) and 200 ml. hexane. To the mixture thus formed, 29 grams (0.5 mole) of allylalcohol was added as a single charge at about 23° C. The resulting reaction mixture was stirred for 2¾ hours during which period a mild exotherm was observed which caused the temperature to rise to about 45° C. The desired crude adduct settled out as a separate phase and was thereafter washed with 200 ml. hexane, isolated by vacuum distillation and purified by distillation in a molecular still. The purified product had the formula:

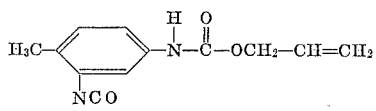

and was obtained in 67 weight percent yield.

EXAMPLE 3

A silicourethane copolymer of this invention having the formula:

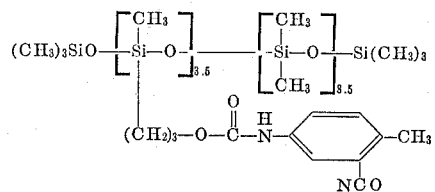

was prepared using the aryl isocyanate-allyl alcohol adduct prepared in Example 2 by the reaction thereof with a dimethyl silicone oil consisting primarily of polymer molecules of the formula:

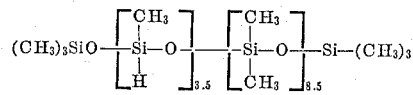

Into a dry glass reactor equipped with stirring means, a thermometer, and a heating mantle, and protected from the atmosphere by a nitrogen purge, was charged 150 grams of the dimethyl silicone oil described above and 150 ml. of toluene. The mixture was heated to 100° C. and approximately 100 parts per million by weight of platinum in the form of chloroplatinic acid was introduced, followed by the addition of 135.8 grams (0.58 mole, approximately 10 percent molar excess) of the aryl isocyanate prepared in Example 2. The reaction mixture was stirred at 100° C. for 4 hours, stripped of toluene, and taken up in 1 liter of warm hexane. After standing for about 16 hours at 5° C. the hexane solution was decanted from 25 ml. of insoluble oil and filtered twice. Upon stripping of the hexane, 170 grams of the desired final product was obtained (approximately 62 weight percent yield).

EXAMPLE 4

The same procedure, reaction condition, apparatus, and formulation as in Example 3 were repeated except that 9.32 grams (0.086 mole) of $$(CH_3)_3SiO[(CH_3)_2SiO]_3Si(CH_3)_2H$$

was employed instead of the silicone of Example 3, and the quantity of aryl isocyanate was reduced to 23.2 grams (0.1 mole). The product yield was 84 mole percent of

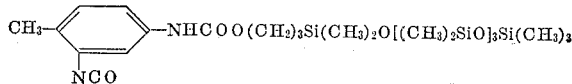

EXAMPLE 5

Using the same procedure as in Example 3, 33 grams (0.11 mole) of $$HSi(CH_3)_2O[(CH_3)_2SiO]_2Si(CH_3)_2H$$

was reacted with 59.6 grams (0.242 mole) of

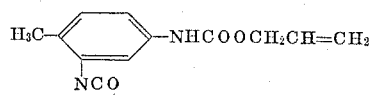

in toluene solution using 50 parts per million of platinum (as chloroplatinic acid) as catalyst. The reaction period was 17 hours at 121° C. and the product had the formula:

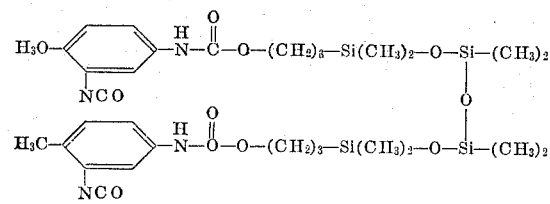

EXAMPLE 6

Using the same procedure as in Example 3, 60 grams (0.023 mole) of hydrosilicon compound having the formula HSi(CH₃)₂O[(CH₃)₂SiO]₃₃Si(CH₃)₂H was reacted in xylene medium over a platinum catalyst with 12.8 grams (0.055 mole) of the aryl isocyanate prepared in Example 2. Reaction period was 4 hours at 130° C. The liquid adduct product has the formula

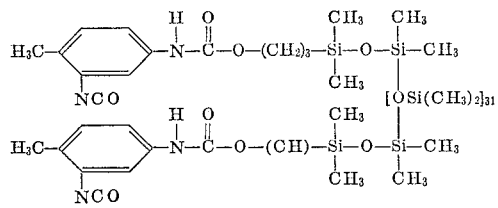

EXAMPLE 7

When Example 6 is repeated using an equivalent molar quantity of an aryl isocyanate having the formula

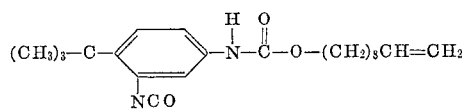

instead of aryl isocyanate of Example 6, the resultant product has the formula

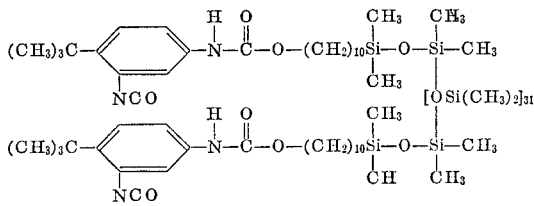

The novel isocyanate containing compounds of this invention are useful as coatings on cellulosic textile fabrics, cellulosic paper and paper products to improve their water repellancy, and as surfactants in polyurethane foaming compositions to provide stable foamed products.

What is claimed is:

1. Process for preparing organosilicon compounds having functional isocyanate groups which comprises contacting at reaction temperatures in the presence of a platinum catalyst an organic isocyanate compound having the general formula:

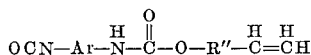

wherein Ar is a divalent arylene radical free of reactive substituent groups and attached to each of the adjacent nitrogen atoms in the molecule through different ring carbon atoms, R″ is alkylene radical containing from 1 to about 9 carbon atoms; with at least one hydrosilicone compound of the class consisting of silanes having the general formula:

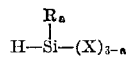

siloxanes having the general formula:

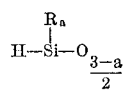

and siloxanes composed essentially of from 0.1 to 99.9 mole percent of the units having the formula:

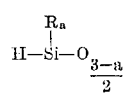

and complementarily from 99.9 to about 0.1 mole percent of units having the general formula:

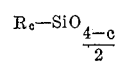

wherein R is a monovalent hydrocarbon group containing 1 to about 18 carbon atoms free of aliphatic unsaturation, and X is a member selected from the group consisting of halogen and —OR radicals, $a$ is an integer having a value of from 0 to 2 inclusive, and $c$ is an integer having a value of from 0 to 3 inclusive.

2. Process according to claim 1 wherein Ar is an arylene radical having the formula:

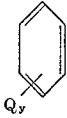

wherein Q is an alkyl radical having from 1 to 10 carbon atoms, $y$ is an integer having a value of from 0 to 2 inclusive.

3. Process according to claim 2 wherein the reactants are contacted in an inert organic solvent medium at a temperature of from about 50° C. to about 250° C.

4. Process according to claim 2 wherein the temperature is within the range of from about 90° C. to about 150° C.

5. Process according to claim 4 wherein the platinum catalyst is chloroplatinic acid and is present in an amount providing from about 0.0001 to about 5.0 parts by weight elemental platinum per 100 parts by weight of the reactants.

References Cited

UNITED STATES PATENTS

| 3,170,891 | 2/1965 | Speier | 260—448.2 |
| 3,179,622 | 4/1965 | Haluska | 260—448.2 |
| 3,179,713 | 4/1965 | Brown | 260—825 |
| 3,208,971 | 9/1965 | Gilkey et al. | 260—46.5 |

HELEN M. McCARTHY, Primary Examiner.

J. P. PODGORSKI, Assistant Examiner.

U.S. Cl. X.R.

260—2.5, 46.5, 448.8; 117—143, 152